(12) United States Patent
Rajamani et al.

(10) Patent No.: US 7,941,616 B2
(45) Date of Patent: May 10, 2011

(54) SYSTEM TO REDUCE INTERFERENCE IN CONCURRENT PROGRAMS

(75) Inventors: Sriram Rajamani, Karnataka (IN); Ganesan Ramalingam, Karnataka (IN); Venkatesh-Prasad Ranganath, Karnataka (IN); Kapil Vaswani, Karnataka (IN)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 12/255,354

(22) Filed: Oct. 21, 2008

(65) Prior Publication Data

US 2010/0100690 A1 Apr. 22, 2010

(51) Int. Cl.
*G06F 12/00* (2006.01)
*G06F 13/00* (2006.01)
*G06F 13/28* (2006.01)

(52) U.S. Cl. ............... 711/152; 711/163; 711/E12.001; 710/200

(58) Field of Classification Search .................. None
See application file for complete search history.

(56) References Cited

U.S. PATENT DOCUMENTS

| | | | | |
|---|---|---|---|---|
| 4,937,736 | A * | 6/1990 | Chang et al. | 711/208 |
| 5,301,290 | A * | 4/1994 | Tetzlaff et al. | 711/142 |
| 5,613,086 | A * | 3/1997 | Frey et al. | 711/152 |
| 6,009,269 | A | 12/1999 | Burrows et al. | |
| 6,026,401 | A | 2/2000 | Brealey et al. | |
| 6,161,196 | A | 12/2000 | Tsai | |
| 6,226,717 | B1 | 5/2001 | Reuter et al. | |
| 6,772,367 | B1 | 8/2004 | Tarafdar et al. | |
| 7,028,119 | B2 | 4/2006 | Hue | |
| 2005/0216798 | A1 | 9/2005 | Yu | |
| 2006/0282476 | A1 | 12/2006 | Dolby et al. | |
| 2007/0198781 | A1 | 8/2007 | Dice et al. | |
| 2007/0245312 | A1 | 10/2007 | Qadeer et al. | |

OTHER PUBLICATIONS

Ratanaworabhan et al., "Detecting and Tolerating Asymmetric Races," http://www.ices.utexas.edu/research/reports/2008/0806.pdf.
Letko et al., "AtomRace: Data Race and Atomicity Violation Detector and Healer," http://www.fit.vutbr.cz/~vojnar/Publications/Ivk-padtad-08.pdf.
"VeriFIT—Java Race Detector & Healer," http://www.fit.vutbr.cz/research/groups/verifit/tools/racedetect/document.html.

* cited by examiner

*Primary Examiner* — Matt Kim
*Assistant Examiner* — Ralph A Verderamo, III
(74) *Attorney, Agent, or Firm* — Marshall, Gerstein & Borun LLP

(57) ABSTRACT

Locks are used to protect variables. All variables protected by a lock are allocated on a page associated with a lock. When a thread (called the owner) acquires the lock, a local copy of the memory page containing the variable is created, the original memory page is protected, and all access of the variable in the owner thread is directed to the local copy. Upon releasing the lock, the changes from the local copy are carried over to the memory page and the memory page is unprotected. Any concurrent access of the variable by non-owner threads triggers an exception handler (due to the protection mechanism) and delays such an access until after the owner thread has finished accessing the variable.

18 Claims, 4 Drawing Sheets

SYSTEM TO REDUCE INTERFERENCE IN CONCURRENT PROGRAMS

BACKGROUND

This Background is intended to provide the basic context of this patent application and it is not intended to describe a specific problem to be solved.

Recent technology shifts have enabled widespread availability of multicore processors, and it is predicted that most computing platforms of the future, ranging from hand-held device, laptops, desktops and servers will have massive numbers of processors. As a result, software of the future needs to be more concurrent than ever to make better use of parallel hardware.

However, concurrent programs are hard to design, develop and debug. One of the key challenges in concurrent programming is avoiding interference between different threads that access and update the same shared variables. When a thread reads and/or updates certain shared variables in a critical section of code, it is usually necessary to ensure that other threads do not observe intermediate values of these shared variables produced by first thread and other threads should not update these variables either. This property is called isolation. Isolation helps avoid undesirable outcomes arising out of unexpected interactions between different threads and it enables local reasoning (that is, it enables programmers to reason locally about each thread, without worrying about interactions from other threads).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of reducing interference between threads and ensuring isolation for critical sections is described. Locks are used to protect variables. All variables protected by a lock are allocated on a page associated with a lock. When a thread (called the owner) accesses a variable, a local copy of the memory page containing the variable is created, the original memory page is protected, and all access of the variable in the owner thread is directed to the local copy. Upon finishing the access to the variable, the changes from the local copy are carried over to the memory page and the memory page is unprotected. Any concurrent access of the variable by non-owner threads triggers an exception handler (due to the protection mechanism) and delays such an access until after the owner thread has finished accessing the variable.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
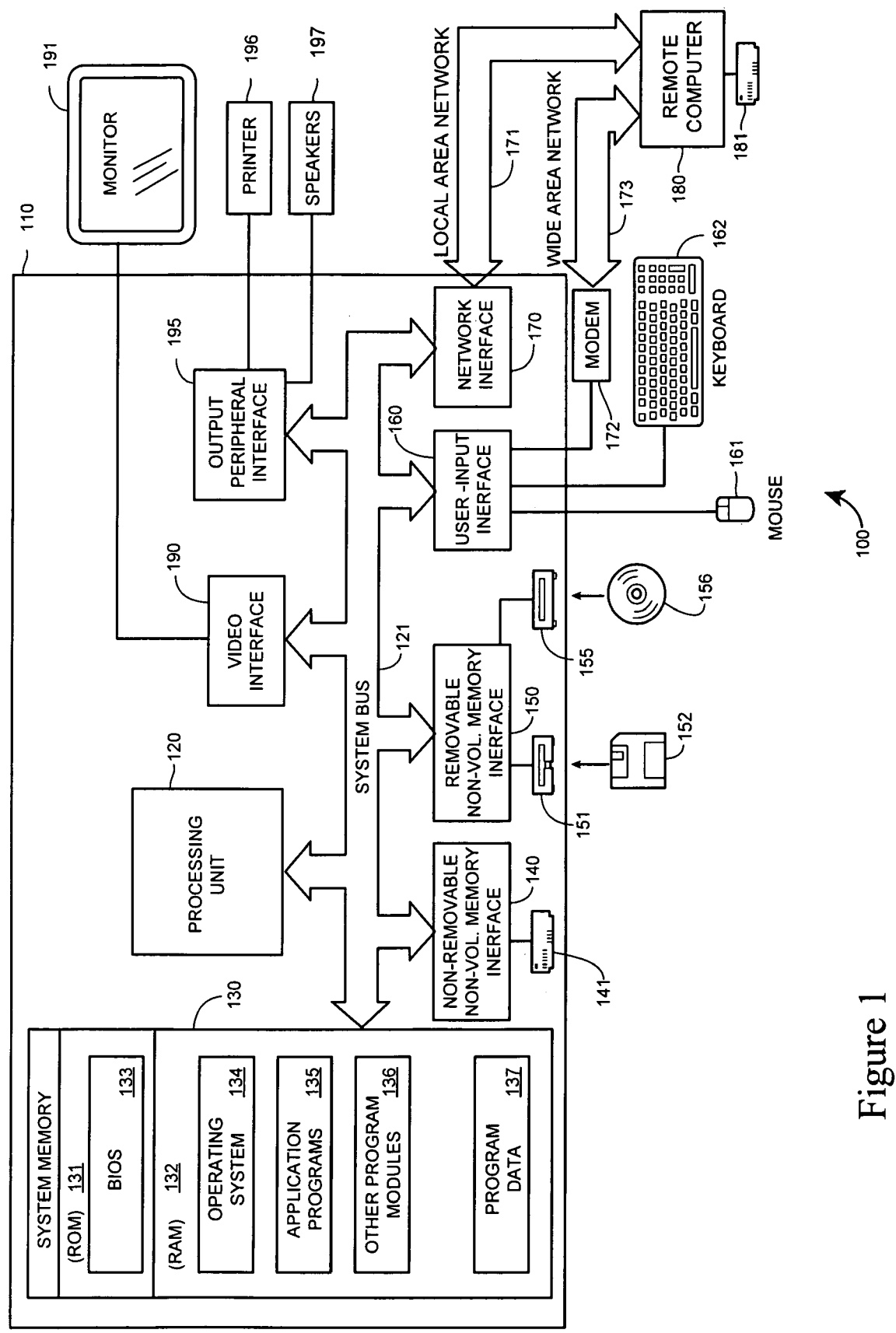
FIG. 1 is an illustration of a computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156.

The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
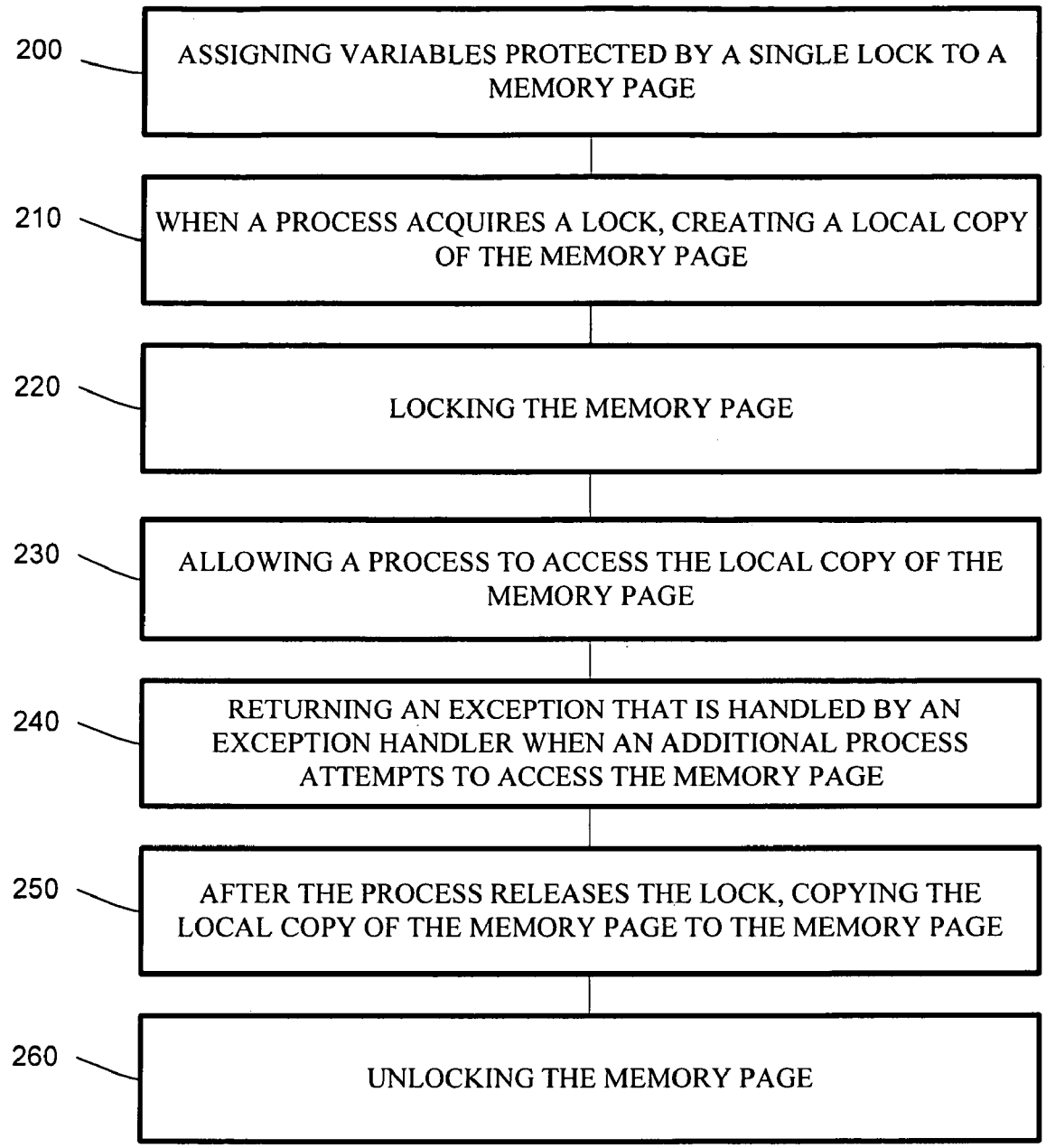
FIG. 2 is an illustration of a method of locking variables.

FIG. 2 may illustrate a method of ensuring isolation for variables protected by a lock. Recent technology shifts have enabled widespread availability of multi-core processors, and it is predicted that most computing platforms of the future, ranging from hand-held device, laptops, desktops and servers will have massive numbers of processors. As a result, software of the future needs to be more concurrent than ever to make better use of parallel hardware.

However, concurrent programs are hard to design, develop and debug. One of the key challenges in concurrent programming is avoiding interference between different threads that access and update the same shared variables. When a thread reads and/or updates certain shared variables in a critical section of code, it is usually necessary to ensure that other threads do not observe intermediate values of these shared variables produced by first thread and other threads should not update these variables either. This property is called isolation. Isolation helps avoid undesirable outcomes arising out of unexpected interactions between different threads and it enables local reasoning (that is, it enables programmers to reason locally about each thread, without worrying about interactions from other threads).

The technique most commonly used to achieve isolation today is locking. Every shared variable has a corresponding lock to protect the variable. The locking discipline requires that every thread acquire the corresponding lock before accessing the shared variable. A thread is well-behaved if it follows this discipline. If all threads are well-behaved, then a thread holding the locks corresponding to a set of shared variables will be isolated from any accesses to those variables from all other threads.

However, programming languages in use today provide no mechanism to ensure that such locking disciplines are indeed followed by all threads in a program. Thus, even when a well-behaved thread holds a lock corresponding to a shared variable nothing prevents another ill-behaved thread from directly accessing the shared variable without acquiring the corresponding lock, either due to programmer error or malice. Such an access violates the isolation property expected by the first thread. Such interferences leads to well-known problems such as non-repeatable reads, lost updates, and dirty reads (or reads of a variable that is in the process of being updated resulting in a read that is outdated).

In this disclosure, a system and mechanism is presented that reduces interference in well-behaved threads of a program that obey the locking discipline even in the presence of ill-behaved threads that disobey the locking discipline. The method uses code instrumentation, data replication, and virtual memory protection to detect any possible violation of isolation. Whenever such a violation is detected, the method delays the ill-behaved thread until all well-behaved threads have released locks on the data.

At block 200, all variables protected by a single lock may be assigned to a memory page. As is known, memory is made up of known quantities that are commonly referred to as pages. Pages are a common size and entire pages can be locked meaning the data in the page cannot to accessed, changed, modified, etc. It is locked from access. In traditional programming, locks are declared and are given names such as lock 1, lock 2, lock 3. The search and locking of variables may be accomplished manually or may be accomplished using another application. The collection of like variables may be stored in a set. Like variables are named variables that have the same name. For example, in a banking application, "balance" may be a locked variable in most instances.

In another embodiment, all instance of the variable are collected and protected by a lock including instance of the variable that are not protected by a lock, including both the locked instance and unlocked instance of the variable. Sometimes, programmers may forget to declare that a variable should be locked. In this embodiment, if a variable is locked anywhere in the application, all instances of this variable are collected, put on the same memory page and are locked. For example, in the banking application example, the variable "balance" may be used repeatedly in the application. The programmer may forget to lock all instances of "balance." In this embodiment, all the instances of "balance" would be located and added to the same memory page.

The search for locked variables may result in a plurality of locked variables. All the locked variables may be collected and like variables may be split into like variable sets. For instance, all the instances of "balance" may be in a balance set, all instances of "social security number" may be stored in the social security number set. The different sets may then be stored on different memory pages. For example, the balance set may be stored on a first memory page and the social security set may be stored on a separate memory page. In one embodiment, the pages are empty except for the locked data and in another embodiment, other unrelated data may be stored in the locked pages with the understanding that this data may be unavailable or locked from time to time.

At block 210, a local copy of the memory page with the locked variables is created. The local copy may be a duplicate of the memory page with the locked variables. At block 220, the memory page with the locked variables may be locked. As previously discussed, a locked page cannot be changed.

In one embodiment, the process that is accessing the locked variable holds the key to the lock. The key is an electronic key that allows the lock to be removed. In this way, only one process at a time may access the locked variable and no other process may be able to access the locked variable until the process with the key is finished with the locked variable. In another embodiment, an administrative function holds the key until the process is complete.

At block 230, the process that attempted to acquire the lock is permitted to access the local copy of the memory page. In this way, the process is permitted to access the variable and continue its operations. The only application that knows of the local copy is the process that attempted to acquire the lock. As no other process knows of the local copy of the locked memory page, there will not be problems with multiple applications attempting to change the variable at the same time.

At block 240, an exception may be returned that is handled by an exception handler when an additional process attempts to access the memory page. For example, if a second application attempted to access "balance" it will be directed to the locked memory page. Logically, an exception will be thrown and the exception handler may catch the exception. In this way, the locked variable will not be accessed accept by the any other application.

At block 250, after the process releases the lock, the local copy of the memory page may be copied to the memory page. In this way, the changes made to the local copy of the memory will be copied to the locked copy of the memory.

At block 260, the memory page may be unlocked after the copying step at block 250 is complete. In this way, the data in the memory page will only be accessed by applications that have permission.

In some embodiments, a report may be generated on processes that have attempted to reach a variable that is locked. Further, the report may also attempt to identify applications that have attempted to reach a variable that is locked. In this way, the applications that are attempting to avoid locks or not respecting locks will be identified. In some embodiment, the offending application developers may be notified of the problem or in another embodiment, the entire offending application may be blocked.

An Illustrative Example

Figure 3:
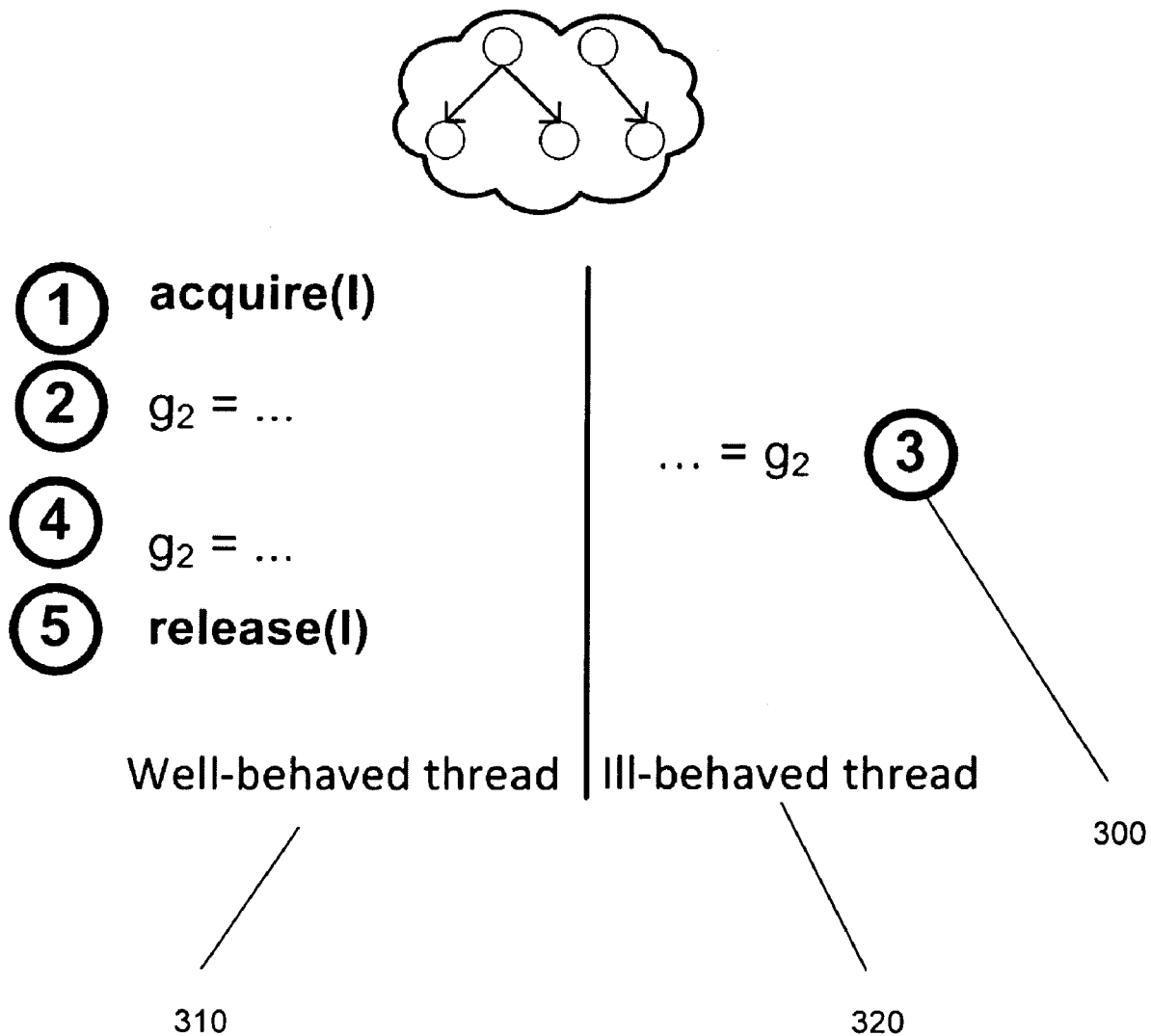
FIG. 3 is an illustration of the effects of an ill-behaved thread accessing a variable without a lock.

FIG. 3 may illustrate a (partial) execution history that contains an isolation violation 300. In the illustration, l stands for lock. At step 1, the lock is acquired and at step 5, the lock is released. The instruction sequence on the left (1, 2, 4, 5) is executed by a well behaved thread 310, while the instruction sequence on the right (3) is executed by an ill-behaved thread 320. The execution of instruction (3) violates isolation 300, as the ill-behaved thread 310 sees an intermediate value of g2 that it is not supposed to see.

Figure 4:
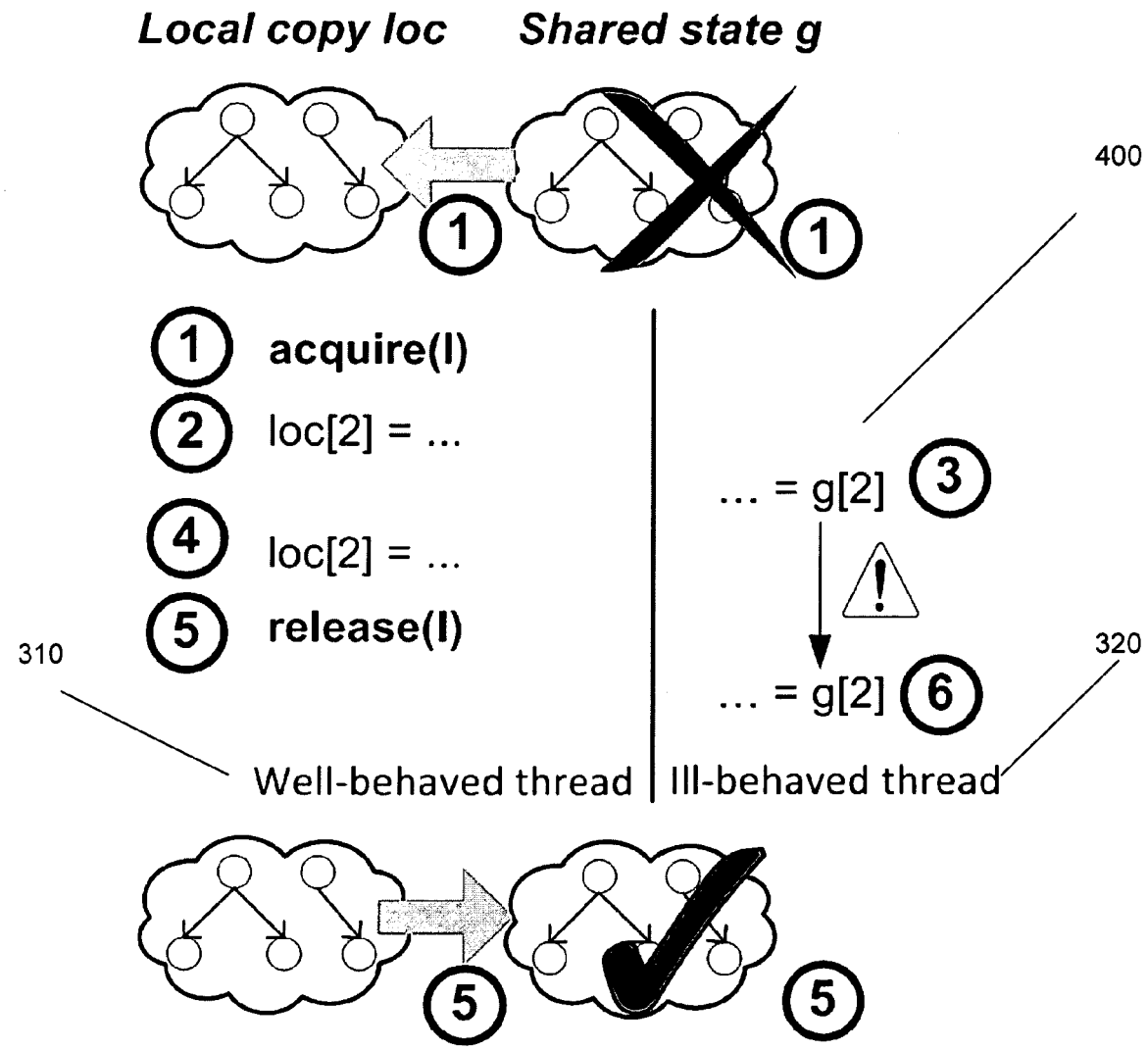
FIG. 4 is an illustration of the effects of an ill-behaved thread attempting to access a variable without a lock in a system that implements one of the various embodiments of the method.

As illustrated in FIG. 4, under various embodiments of the method described herein, when the well-behaved thread 310 acquires the lock 1, it makes a local copy of the shared variables protected by l, enables memory protection for the global copy of the shared variables, and starts executing operations in the critical section. As accesses in the critical section operate on the local copy, these accesses do not violate memory protection. In the middle of the critical section, assume that an ill-behaved thread 320 tries to concurrently access a shared variable (as discussed earlier). As the shared variable is protected, such an access raises a memory protection violation exception 400 that will be caught by custom exception handler in the context of the ill-behaved thread 320. At this point, the possibility of an isolation violation 400 will be detected, the ill behaved thread 320 will be forced to wait and g2 will not be accessed by the ill-behaved thread 320 until it is released.

Upon catching the exception, the custom exception handler may force the ill-behaved thread 320 to back-off by temporarily yielding control. When the ill-behaved thread 320 is subsequently scheduled to execute, it will continue with the access only if the memory protection has been disabled on the global copy of the shared variable (i.e., none of the well behaved threads 310 hold the lock protecting the global copy). Otherwise, the ill-behaved thread 320 will again yield control. Hence, the access to the global copy of a shared variable by an ill-behaved thread 310 is delayed until it can occur outside of a critical section, thus ensuring isolation.

Although the core method may enforce isolation, it does not provide any progress guarantees to ill-behaved threads 320. In some cases, an ill-behaved thread 320 may starve for long durations while well-behaved threads 310 hold locks on shared variables. But note that such behavior is identical to what can happen if the ill-behaved thread 320 were to correctly follow the locking discipline.

Implementation Choices and Extensions

Optimizations

There are several optimizations that may be applied to reduce the runtime overheads of the method. For instance, one embodiment copies variables protected by a lock and enables/disables protection every time a lock is acquired or released. On certain systems, this may lead to high overheads because both these operations (lock/unlock) are expensive in terms of system overhead usage. To reduce these overheads, in some embodiments, the variables may be copied from the lock memory page to the shared memory page and memory protection is disabled (unlocked) only when an exception is raised. When a lock is released by a well-behaved thread, no copying is performed. In this embodiment, overhead usage may be reduced.

Memory Protection

As explained earlier, various embodiments of the method require some form of memory protection mechanism to capture accesses to protected variables and gain execution control. Most modern operating systems, including Windows® and Linux, support some form of memory protection. One implementation uses the Windows Virtual Memory API, which enables a process to modify access protection at the granularity of virtual memory pages. This API is commonly used by the OS to detect stack overflows and guard critical data structures against corruption. This requires that only shared variables protected by the same lock be allocated on the same page.

Page protection is not the only mechanism for protecting memory. Modern processors support increasingly sophisticated performance monitoring hardware, including mechanisms for profiling events originating from specific address ranges. Researchers have also proposed hardware techniques for tracking memory accesses. Such event counting and memory monitoring mechanisms can be easily configured to detect faulty accesses and drive fault tolerance techniques like various embodiments of the method. While the traditional use of event counting hardware has been restricted to performance analysis and tuning during application development, such features can be exploited by fault tolerance techniques such as various embodiments of the method as well.

Specifying Locking Disciplines

As previously described, various embodiments of the method enforce a given locking discipline to avoid concurrency errors like race conditions and ensure isolation for well-behaved threads 310. One implementation relies on the programmer to specify a locking discipline. However, the burden on the programmer may be potential reduced by using existing static analysis techniques for inferring locking protocols to generate an initial specification of the locking discipline. The inferred locking discipline can be checked and refined by the programmer and then provided as input to various embodiments of the method.

Pointers and Aliasing

The simple programming language presented previously makes it difficult to support pointers. Pointers to shared variables introduce some complications to the implementation of the various embodiments of the method. In the absence of pointers, references to a shared variable g1 in the well-behaved thread's 310 code can be easily identified and transformed into a reference to the local copy lc1 during the code instrumentation phase. If a well-behaved thread 310 contains a reference of the form "*p" involving pointer indirection, then various embodiments of the method need to determine if this reference is to a shared variable to redirect the reference appropriately. If static analysis can precisely determine whether an indirect reference is to a shared variable, a runtime check may be avoided. Otherwise, the various embodiments of the method may need to use a runtime check to resolve this question. Note that redirecting an access to a shared variable also requires knowing where the corresponding local copy resides. By always allocating shared variables and their local copies in successive pages, the redirection may be simplified by adding a simple constant, otherwise, the redirection will require another indirection at runtime if the referenced variable is not known at instrumentation time.

Dynamically Allocated Shared Data

With the techniques described above for handling pointers, various embodiments of the method may be easily extended to protect shared dynamic data structures. The various embodiments of the method uses a custom memory allocator that allocates all shared data protected by the same lock contiguously on a set of virtual memory pages associated to the lock. For each such shared page, the custom allocator allocates a corresponding shadow page, which serves as the local copy. Dynamic shared data, however, complicates the specification of which lock protects which data. The various embodiments of the method may impose the simplifying restriction that all dynamic memory allocated at the same allocation site is protected by the same lock. Thus, it suffices to specify which lock protects which allocation site.

Well-Behavedness Assumption

The various embodiments of the method may take a set of thread ids W as input, instruments the threads identified by W, and guarantees isolation for the threads identified by W. Some embodiments assume that all threads in W are well-behaved 310. However, it may be straight-forward to relax this assumption. If a thread in W is not well-behaved 320, then various embodiments of the method need to redirect a reference to a shared variable in the thread to the corresponding local copy only when the thread holds the corresponding lock. This means that various embodiments of the method may need to add a runtime check (just like for pointer dereferences) for this, unless static analysis can eliminate the runtime check. Note that when an instrumented thread is not well-behaved 310, it is guaranteed isolation for variables for which it does acquire locks.

Scheduling Ill-Behaved Threads

In various embodiments of the method, exceptions are raised when ill-behaved threads 320 violate isolation. Once an exception is raised, the exception handler in the various embodiments of the method execute in the context of the ill-behaving thread 320 and influences the way a thread is scheduled in the future. There are several policies that various embodiments of the method may use for scheduling ill behaved 320 threads.

Back-Off and Retry

A simple policy of back-off and retry forces an ill-behaving thread 320 to yield control and retry the conflicting access when the thread is subsequently scheduled. This strategy is simple to implement and guarantees isolation (for the well-behaved 310 threads).

The above strategy works well when a program can make progress using only interleavings that ensure isolation. However, it is possible to write (buggy) programs that can reach a state where progress can be made only using interleavings that violate isolation. The table below illustrates this scenario.

| Thread Twell | Thread Till |
|---|---|
| Acquire(l1); | Acquire(l2); |
| g1 = ... | ... = g2 |
| Acquire(l2); | g1 = ... |

Here, a well behaved thread 310 Twell contains both a top level and a nested critical section defined by locks l1 and l2 which protect variables g1 and g2, respectively. The ill-behaved thread Till 320 accesses both g1 and g2 but does not acquire lock l1 before accessing g1. Consider an interleaving where Twell 310 acquires lock l1, Till 320 acquires lock l2, Twell 310 tries to acquire lock l2 while Till 320 attempts to access g1 without acquiring lock l1. This state may lead to a deadlock in the various described embodiments of the method. This is perfectly understandable and reasonable since the various described embodiments of the method are trying to enforce a locking discipline.

However, if a user desires, it is possible to use some variations of the various described embodiments of the method that provide some progress guarantee for ill-behaved threads 320 (and avoid deadlocks), at the cost of compromising on the isolation guarantee.

Back-Off and Retry with Threshold

The above situation can be addressed by limiting the number of back-off and retry attempts. In this variant of the simple back-off and retry policy, the various described embodiments of the method maintain a count of the number of times an ill-behaving thread 320 has been forced to retry a conflicting access without succeeded. If this count exceeds a pre-determined threshold, the various described embodiments of the method assume that a deadlock can occur and allows the ill-behaved thread 320 to make progress. This policy avoids deadlocks at the cost of allowing a few isolation violations, including those which could have been tolerated if the various described embodiments of the method had stalled the ill-behaved thread 320 for a longer duration.

Back-Off and Retry with Deadlock Detection

This variant uses a dynamic deadlock detector (implemented as part of the exception handler with support from the threading library) to determine whether using a back-off and retry would result in a deadlock. This policy may represent the best case scenario for the various described embodiments of the method as it allows only those isolation violations that lead to deadlocks. In such situation, the various described embodiments of the method can log the observed isolation violations and reports them to the programmer.

In conclusion, the various embodiments of the method describe a dynamic technique to ensure isolation in concurrent programs that employ a locking discipline LD and are composed of both well-behaved threads 310 and ill-behaved threads 320 with respect to LD. The various embodiments of the method detect shared data accesses that cause isolation violation by employing memory protection mechanisms for shared data. Upon detection, the various embodiments of the method delay the execution of such accesses until they can execute without violating isolation. In terms of program behavior, the various embodiments of the method permit every existing isolated behavior in a program and do not introduce any new behavior.

The invention claimed is:
1. A method of locking variables comprising:
assigning a variable protected by a single lock to a memory page;
creating a local copy of the memory page;

locking the memory page;
allowing a process to access the local copy of the memory page;
returning an exception that is handled by an exception handler when an additional process attempts to access the memory page;
after the process is finished with the local copy of the memory page, copying the local copy of the memory page to the memory page; and
unlocking the memory page.

2. The method of claim 1, further comprising instructing the process to hold the key to the lock.

3. The method of claim 1, further comprising generating a report on processes that have attempted to reach a variable that is locked.

4. The method of claim 3, further comprising identifying applications that have attempted to reach a variable that is locked.

5. The method of claim 1, further comprising modifying application code to assign all copies of a specific variable protected by a single lock to a single memory page.

6. The method of claim 1, further comprising:
collecting all variables protected by a lock,
collecting all like variables that are protected by a lock into a like variable set; and
storing all variables in the like variable set on the same memory page that is not shared with other data.

7. The method of claim 6, further comprising collecting all instance of the variable protected by a lock including instance of the variable that are not protected by a lock and including both the locked instance and unlocked instance of the variable in the variable set.

8. The method of claim 6, wherein a first set of like variables are stored on a first memory page and a second set of like variables are stored on a second memory page.

9. A computer storage medium comprising computer executable code for locking variables, the computer executable code comprising code for
assigning a variable protected by a single lock to a memory page;
creating a local copy of the memory page;
locking the memory page;
allowing a process to access the local copy of the memory page;
returning an exception that is handled by an exception handler when an additional process attempts to access the memory page;
after the process is finished with the local copy of the memory page, copying the local copy of the memory page to the memory page;
unlocking the memory page; and
generating a report on processes or applications that have attempted to reach a variable that is locked.

10. The computer storage medium of claim 9, further comprising computer executable instructions for instructing the process to hold the key to the lock.

11. The computer storage medium of claim 9, further comprising computer executable instructions for modifying application code to assign all copies of a specific variable protected by a single lock to a single memory page.

12. The computer storage medium of claim 9, further comprising computer executable instructions for:
collecting all variables protected by a lock,
collecting all like variables that are protected by a lock into a like variable set; and
storing each like variable set that is protected by a lock on an individual memory page that is not shared with other data.

13. The computer storage medium of claim 12, further comprising computer executable instructions for collecting all instance of the variable protected by a lock including instance of the variable that are not protected by a lock and including both the locked instance and unlocked instance of the variable in the variable set.

14. The computer storage medium of claim 12, wherein a first set of like variables are store on a first memory page and a second set of like variables are stored on a second memory page.

15. A computer system comprising a processor, a memory in communication with the processor and an input output circuit; the processor being configured in accordance with computer executable instructions for locking variables, the computer executable instructions comprising instructions for:
assigning a variable protected by a single lock to a memory page;
creating a local copy of the memory page;
locking the memory page;
allowing the process to hold the key to the lock
allowing a process to access the local copy of the memory page;
returning an exception that is handled by an exception handler when an additional process attempts to access the memory page;
after the process is finished with the local copy of the memory page, copying the local copy of the memory page to the memory page;
unlocking the memory page; and
generating a report on processes or applications that have attempted to reach a variable that is locked.

16. The computer system of claim 15, further comprising computer executable instructions for:
collecting all variables protected by a lock,
collecting all like variables that are protected by a lock into a like variable set; and
storing all variables in the like variable set on the same memory page that is not shared with other data.

17. The computer system of claim 15, further comprising computer executable instructions for collecting all instance of the variable protected by a lock including instance of the variable that are not protected by a lock and including both the locked instance and unlocked instance of the variable in the variable set.

18. The computer system of claim 15, wherein a first set of like variables are store on a first memory page and a second set of like variables are stored on a second memory page.

* * * * *